S. B. MINNICH.
METHOD OF JOINING BALE TIES.
APPLICATION FILED DEC. 27, 1917.
1,285,308.
Patented Nov. 19, 1918.
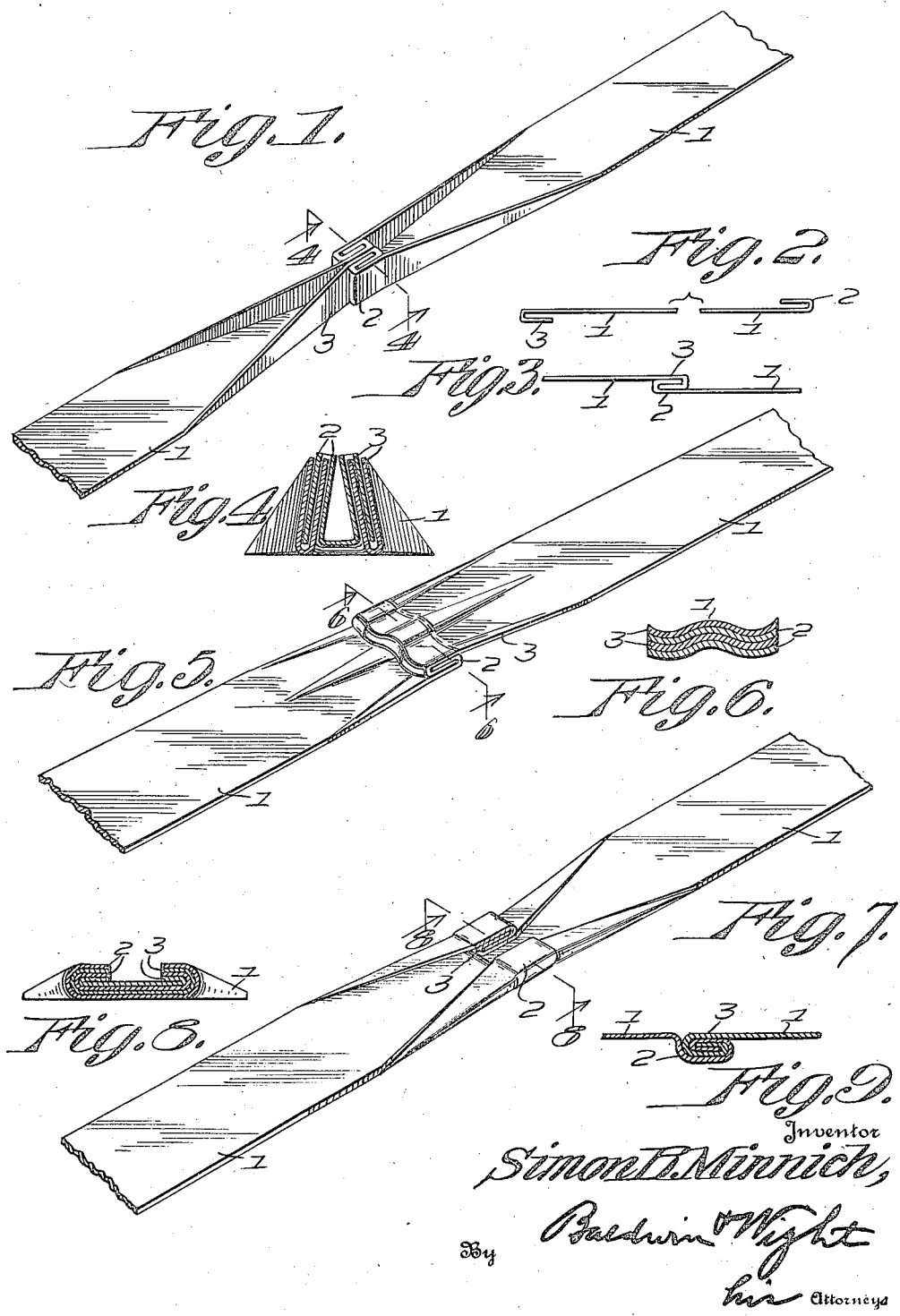
Inventor
Simon B. Minnich,
By Baldwin & Wight
his Attorneys

UNITED STATES PATENT OFFICE.

SIMON B. MINNICH, OF LANDISVILLE, PENNSYLVANIA, ASSIGNOR TO MARY C. MINNICH, OF LANDISVILLE, PENNSYLVANIA.

METHOD OF JOINING BALE-TIES.

1,285,308.

Specification of Letters Patent.

Patented Nov. 19, 1918.

Application filed December 27, 1917. Serial No. 209,135.

*To all whom it may concern:*

Be it known that I, SIMON B. MINNICH, a citizen of the United States, residing at Landisville, in the county of Lancaster and State of Pennsylvania, have invented certain new and useful Improvements in Methods of Joining Bale-Ties, of which the following is a specification.

The object of my invention is to provide a novel, simple and effective method of securely joining the ends of metal straps, such as bale ties, with the employment of a minimum amount of material at the joint.

According to my invention, hooks are formed on the ends of the strap to be joined, the ends are brought together and the hooks interlocked to form a lap-joint. The joint is then suitably bent transversely of itself to prevent the hook portions from pulling apart or yielding under strain.

Referring to the accompanying drawings,

Figure 1 is a perspective view of a strap or bale tie joined according to my invention and in the preferred manner.

Fig. 2 represents a side elevation of a bale tie showing how the hooks are formed thereon.

Fig. 3 is a side elevation, representing the hooks brought together and interlocked to form a lap-joint.

Fig. 4 is an enlarged section on the line 4—4 of Fig. 1, showing the preferred manner in which the joint is bent.

Fig. 5 is a perspective view of a modification, showing the joint transversely corrugated.

Fig. 6 is an enlarged section on the line 6—6 of Fig. 5.

Fig. 7 is an enlarged perspective view of a modification, showing the sides of the joint bent over flat.

Fig. 8 is an enlarged section on the line 8—8 of Fig. 7.

Fig. 9 represents a section longitudinally of the strap, showing another form in which the joint may be folded double before being bent.

In the accompanying drawings 1 represents a bale tie, or other metallic strap, having its ends bent back to form hooks 2 and 3 (see Fig. 2), preferably of equal length, one of the hooks being disposed on one side of the strap and the second on the other side, whereby the ends may be bent around and interlocked to form a lap-joint, as shown in Fig. 3. These hooks 2 and 3 might be formed on the tie before it is applied to the bale, or by the use of a suitable plier I could form them after the tie has been placed around the bale and before the bale has been released from pressure. In either event, however, the hooks are comparatively short, whereby excessive leverage tending to open the hooks when they are subjected to tension is prevented and a saving of material is effected. After being hooked, the lap is preferably pressed to compact the folds of material, and the joint is then bent or crimped in any suitable manner transversely of its width, thereby forming ribs or kinks in the interlocking hooks which effectively prevent the hooks from being opened, even when subjected to a considerable strain.

In Figs. 1 and 4 I have shown the preferred way of bending the lap-joint to bring the sides of the strap together, as such a method of folding the sides together not only securely prevents the joint from opening and is more simple to form, but it tends to draw the strap tighter on the bale.

In Figs. 5 and 6 the joint is corrugated to form a series of ribs or kinks in the joint, and in Figs. 7 and 8 the sides of the joint are bent over and flattened down upon the strap.

When it is desired to give added strength to the joint, I may fold the lap over to double the hook portion before bending it transversely, as shown in Fig. 9, whereby six thicknesses of metal in the joint are produced instead of four, as in the preceding constructions.

The bending of the edges may be performed by any suitable device for this purpose, or a simple plier may be used. The edges may be curled on the side adjacent the bale, or on the opposite side.

It is obvious that by the use of my invention, a saving of material is effected by dispensing with greatly overlapped ends, and a simple and secure fastening is provided without the use of separate buckles or other connectors.

I claim as my invention:—

1. An improved method of connecting metal straps, which consists in forming the straps with hooked portions, interlocking two hooked portions to form a lap-joint, and then bending the joint transversely of the width of the strap to prevent said hooked portions from pulling apart.

2. An improved method of connecting metal straps, which consists in forming the straps with comparatively short hooked portions, interlocking two hooked portions to form a lap-joint, and then bending the joint transversely of the width of the strap to prevent said hooked portions from pulling apart.

3. A bale tie comprising a strap having its ends provided with hooked portions interlocked to form a lap-joint, and having the lap-joint bent transversely of the width of the strap to prevent the hooks from unfolding.

4. A bale tie comprising a strap having its ends provided with hooked portions interlocked to form a lap-joint, and having the lap-joint and the adjacent portions of the strap bent transversely of the width of the strap to prevent the hooks from unfolding.

5. A metallic strap joint having the joining ends provided with hooked portions interlocked to form a lap-joint, and having the lap-joint bent transversely of the width of the strap to prevent the hooks from unfolding.

6. A metallic strap joint having the joining ends provided with hooked portions interlocked to form a lap-joint, and having the sides of the lap-joint bent inwardly and converging toward each other.

7. An improved method of connecting metal straps, which consists in forming the ends of the straps with hooked portions, interlocking two hooked portions to form a lap joint, bending the sides of the strap adjacent the lap joint to converge toward the lap joint, and bending the lap joint transversely of itself whereby the lap joint is prevented from being pulled or pushed apart.

8. A bale tie comprising a strap having its ends provided with hooked portions interlocked to form a lap joint having the sides of the strap adjacent the lap joint bent inwardly to converge toward the lap joint and having the lap joint bent transversely of itself whereby the lap joint is prevented from being pulled or pushed apart.

9. An improved method of connecting metal straps which consists in forming the ends of the straps to be joined with hooked portions, interlocking two hooked portions to form a lap joint, bending the side portions of the straps adjacent the lap joint inwardly, and then bending the joint transversely of itself to prevent the hooked portions from being pulled or pushed apart.

In testimony whereof, I have hereunto subscribed my name.

SIMON B. MINNICH.